No. 691,668. Patented Jan. 21, 1902.
C. RUPP.
SKYLIGHT.
(Application filed Nov. 6, 1899.)
(No Model.) 2 Sheets—Sheet 1.
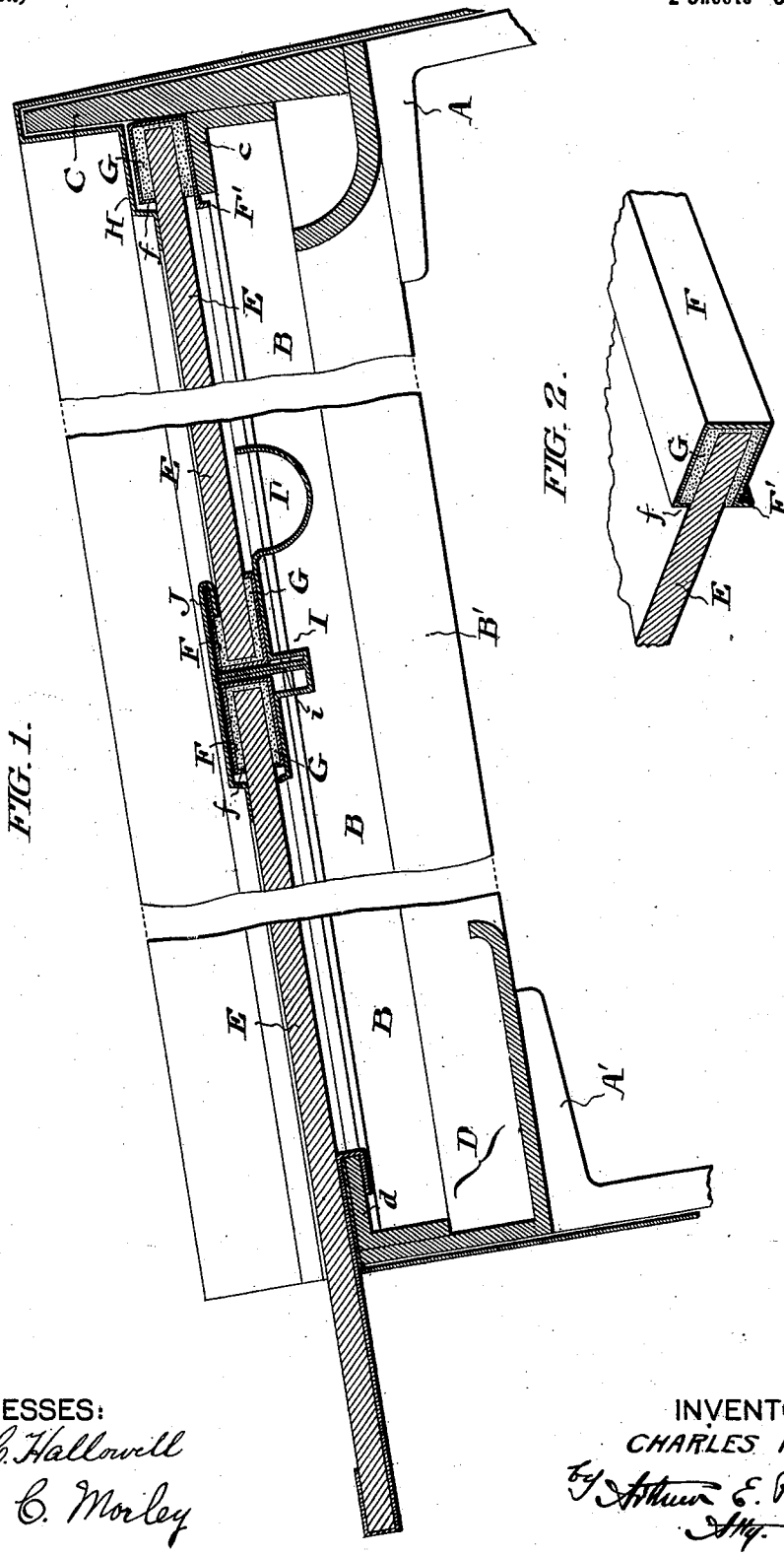
WITNESSES:
Clifton C. Hallowell
Frank C. Morley
INVENTOR:
CHARLES RUPP,
by Arthur E. Paige
Atty.

No. 691,668. Patented Jan. 21, 1902.
C. RUPP.
SKYLIGHT.
(Application filed Nov. 6, 1899.)
(No Model.) 2 Sheets—Sheet 2.

WITNESSES:
Clifton C. Hallowell
Frank C. Morley

INVENTOR:
CHARLES RUPP,
by Arthur E. Paige
Atty.

UNITED STATES PATENT OFFICE.

CHARLES RUPP, OF PHILADELPHIA, PENNSYLVANIA.

SKYLIGHT.

SPECIFICATION forming part of Letters Patent No. 691,668, dated January 21, 1902.

Application filed November 6, 1899. Serial No. 735,920. (No model.)

*To all whom it may concern:*

Be it known that I, CHARLES RUPP, of Philadelphia, in the State of Pennsylvania, have invented certain new and useful Improvements in Skylights, whereof the following is a specification, reference being had to the accompanying drawings.

My improvements are peculiarly applicable to skylights comprising large spans—such as form the roofs of train-sheds, mills, and similar structures—which are subjected to vibration from the action of the wind, the movement of trains, traveling cranes, heavy machinery, &c. Such spans comprise a framework of sash-bars, upon and between which are mounted sheets of glass forming panels. In order to form a water-tight joint between the edges of the glass and the supporting-framework aforesaid, it is usual to rigidly secure the glass upon flanges of said sash-bars beneath a ductile metal glazing-strip compressed thereon to fit the inequalities of the glass or to embed the edges of the glass in cement lodged on the flanges of said bars in rigid relation therewith. Any form of skylight wherein the glass is rigidly secured to the sash-bars is objectionable, in that the expansion and contraction of the glass and framing, as well as the vibration thereof due to moving loads adjacent thereto, suffice to either shatter the glass or loosen the same and destroy its water-tight connection with the sash-bar.

Therefore it is the object of my invention to provide means whereby the sheets or panels of glass may be mounted on the sash-bars to vibrate loosely with respect thereto without permitting the influx of rain-water, &c.; and to secure such result I provide each of said loose panels with marginal strips fixed thereon independent of said supporting structure and projecting above the surface of the glass, as hereinafter more particularly described.

Figure 3:
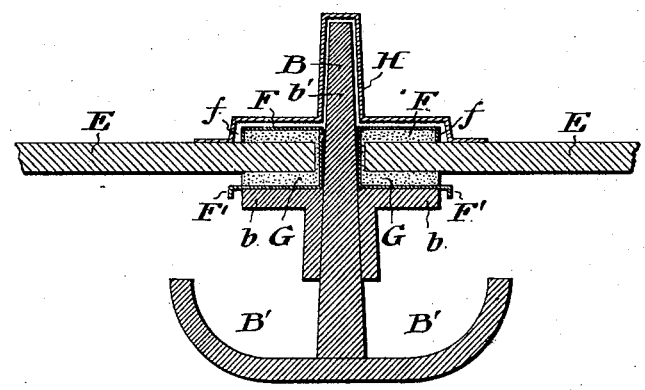
Figure 4:
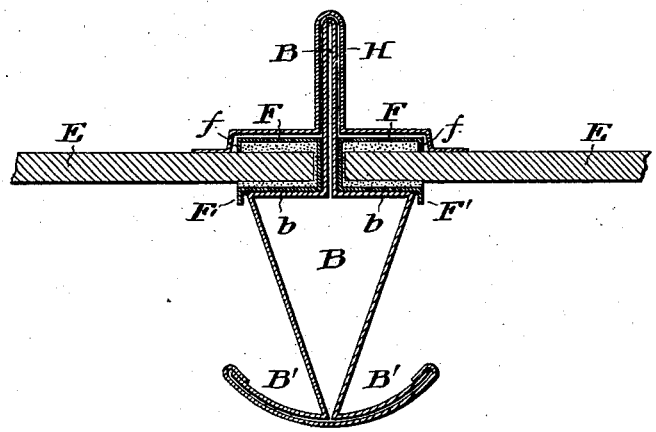
Figure 5:
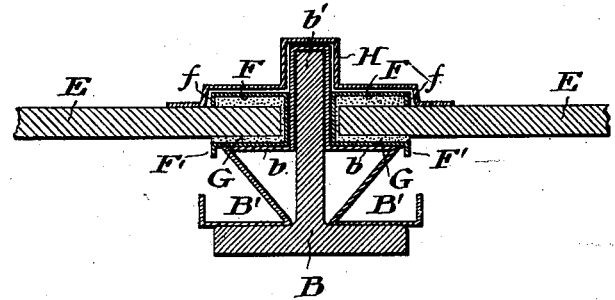

In the accompanying drawings, Figure 1 is a vertical sectional view showing a portion of a skylight embodying my invention. Fig. 2 is a perspective view showing a fragment of a panel of glass with my improved pocketed strip secured upon the margin thereof. Fig. 3 is a cross-sectional view of a wrought-metal sash-bar, showing an embodiment of my invention. Fig. 4 is a cross-sectional view of a sheet-metal sash-bar, showing an embodiment of my invention. Fig. 5 is a cross-sectional view of a combined wrought-metal and sheet-metal sash-bar, showing an embodiment of my invention.

Referring to Fig. 1, A A' are members of the framework, upon which are mounted sash-bars B, said bars being connected transversely by means of the head-bar C and curbing D. The glass plates E extend from bar to bar and are upheld by the flanges $b$ $c$ $d$. Each of the panels of glass is independently framed with marginal strips F, which are pocketed, as shown in Fig. 2, to receive a filling of any suitable cement G, within which the edges of the glass are embedded and by which each strip F is secured in permanently rigid relation with the glass. It is therefore to be understood that each sheet of glass, however fluted or otherwise unequal its surface may be, is provided with a planular margin of said strips F, and thus adapted to rest upon and loosely vibrate with respect to the supporting-framework of sash-bars, &c., from which it is, however, wholly separate.

As shown in the several figures, the strips F form ledges $f$, projecting above the upper surface of the glass E a sufficient height to prevent the rain-water, which traverses said surface, from overflowing upon the flanges $b$ of the sash-bars B, by which the glass E is upheld, as shown in Figs. 3 to 5, inclusive. The caps H, which cover the vertical webs $b'$ of the sash-bars, overlap the strips F and prevent the fall of rain or snow at the junctions of the glass and sash-bars. Said caps H do not, however, bind the glass plates E or in any manner interfere with the freedom of movement thereof.

Although the ledges $f$ suffice under normal conditions to prevent any lateral overflow from the glass plates E, I prefer to provide the strips F with drip-flanges F', depending below the lower surface of said plates, to prevent the possible discharge of water upon said lower surface, and said flanges F' overhang the gutters B' of the sash-bars to insure the discharge of any drip therein.

When the panels between the sash-bars B are of such length as not to be conveniently formed with single plates of glass E, I prefer to resort to the butt-joint shown in Fig. 1. Said joint comprises a cross-clip I, which serves to support the adjoining edges of the respective plates E in alinement, as shown, and is conveniently provided with a gutter I' and vertical web i. In this form of my invention I prefer to cement the cap-plate J between the upper surface of the glass plate and the adjacent flange of the pocketed strip F, said cap-plate serving to shed the water from the upper to the lower portion of the panel, as may be understood by reference to Fig. 1.

It is to be understood that my invention is not limited to embodiment in sash-bars of the particular forms which I have shown, but is applicable to any convenient form of sash-bar provided with a cap arranged to shed the water away from the loose joint made by the pocketed strips F, resting upon the sash-bar.

I believe it to be new to provide a skylight-plate with marginal strips fixed in rigid relation therewith and to mount said plate in a supporting-framework in such relation therewith as to permit of its free vibration with respect thereto. I therefore do not desire to limit myself to the precise construction or arrangement of the parts which I have shown and described, as it is obvious that various modifications may be made therein without departing from the spirit of my invention.

I claim—

1. The combination with an independent glass plate of a skylight, of a strip, fixed upon the margin of said plate, and projecting above the upper surface thereof, in water-tight relation therewith, a drip-flange upon said strip, depending from the lower surface of said plate, and a cap member J, secured beneath said strip and having a free edge projecting beyond the margin of said plate, substantially as set forth.

2. The combination with a skylight-frame, of a glass plate mounted to vibrate loosely in said frame, a strip independent of said frame, fixed upon the margin of said plate, in water-tight relation therewith, and a cap member secured beneath said strip, and having its free edge projecting beyond the margin of said plate, substantially as set forth.

CHARLES RUPP.

Witnesses:
ARTHUR E. PAIGE,
EDWD. C. REGN.